Oct. 3, 1967     W. A. OSBORNE     3,344,497

SELF-CLEANING ROUTER

Filed March 23, 1966

INVENTOR.
WILLIAM A. OSBORNE

By Miketta, Glenny, Poms & Smith
ATTORNEYS.

United States Patent Office 3,344,497
Patented Oct. 3, 1967

3,344,497
SELF-CLEANING ROUTER
William Albert Osborne, 1520 S. Gerhart,
Los Angeles, Calif. 90022
Filed Mar. 23, 1966, Ser. No. 536,823
2 Claims. (Cl. 29—103)

The present invention relates to an improved, self-cleaning router characterized by an ability to cut and face various metals and laminates in an effective manner over an extended life period.

During use in cutting, trimming or contouring work pieces, particularly softer metals, resin-bonded plywood and other laminates, the outer surface of prior routers, adjacent the cutting edge thereof, build up a deposit which may become 1/16" thick. A deposit of any thickness, even 10.03" thick, greatly impairs the usefulness of the router since its cutting ability is drastically decreased and the tool has a tendency to chatter and vibrate so violently as to make it impossible to cut a smooth face or follow the pattern established by a router block. It is to be remembered that routers often have to work along concave surfaces, and even a very minor deposit of cuttings, resin or metal, interferes with the effective utilization of the router and the production of a smooth face on the work.

Routers are ordinarily motor driven at relatively high rotational speeds while connected to a motor spindle through a router chuck and a collar (which rests on and follows the edge of a router block). Ordinarily the router block acts as a guide, the router block being secured to a plurality of sheets of metal or plywood, etc. to be cut to the pattern established by the block. In some instances, the router is used without a pattern block, the workman following a template or scribed line on the work piece. The "build-up" previously referred to is the cause of either imperfectly followed patterns and imperfectly contoured or cut work pieces, or is the cause of interruptions in the progress of the work for the purpose of changing routers. The time thus wasted and the cost of the routers materially increases production costs.

The present invention is directed to an improved, self-cleaning router which will not permit the "build-up," and therefore is capable of producing much more accurate work pieces, has a greatly extended effective life and results in lowered production costs.

An object of the present invention therefor is to disclose and provide a router construction which eliminates the rapid "build-up" on the outer surface of a router, and thereby expedites and facilitates accurate routing to a predetermined pattern and results in a tool of greatly extended operating life.

A further object of the present invention is to disclose a router having all of the advantages hereinabove noted, which is capable of being manufactured in an economical manner.

Other objects and advantages of the present invention will become apparent to those familiar with the subject matter from the following description. For purposes of illustration and in order to facilitate understanding reference will be had to the appended drawings in which.

Figure 1:
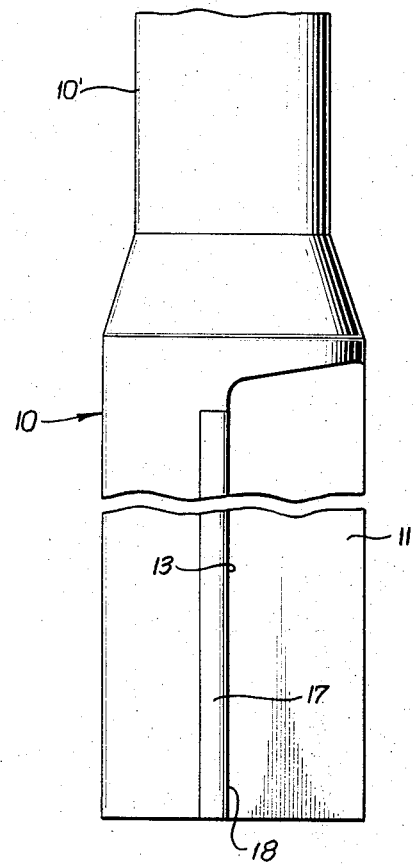
FIG. 1 is an enlarged side elevation (portions being broken away) of a router constructed in accordance with the present invention.

As shown in the drawings, the router of the present invention includes a body or shank 10, the upper portion 10' of the shank being generally of somewhat smaller diameter and being arranged to be grasped by a chuck associated with the driven spindle of a motor. The shank 10 is normally provided with flutes, such as 11 and 11', extending longitudinally of the shank (but sometimes such shanks extend in a lazy spiral of not more than ½ revolution). The end face of the router is normally transverse to its axis as indicated at 12. The direction of rotation of a router is generally indicated by the arrow in FIG. 2. It will be seen that each flute 11 constitutes a recess adapted to accumulate chips cut by the router and each flute includes a so-called tooth face 13 which normally lies in a plane parallel to the axis of the router, which plane when extended will either pass through the longitudinal axis of the router or be spaced therefrom a minor distance, not exceeding 20% of the diameter of the virtually cylindrical shank 10. The other face, indicated at 14, extends inwardly from the circumference of the shank and is joined to the tooth face by a curved or flitted arc at a zone spaced from the axis of the shank. Although normally a router only contains two flutes, some routers of greater rotational stability have had three flutes.

In accordance with the present invention, each tooth face of a flute includes a marginal recess indicated at 16 adapted to receive a hard cutter strip 17. Although the shank is made of tough steel, the cutter strip 17 is made of tool steel, hardened steel or tungsten carbide. The cutter strip 17 is welded, braised or otherwise permanently fastened within the recess 16 which extends along the entire longitudinally extending edge of the face 13.

The router of the present invention presents a cutting edge 18 at the conjunction of the cutting face 13 (or the face of the cutter strip 17 which lies in a plane parallel to the face 13) and a concave surface 20 formed in the outer face of the strip 17. The cutting edge 18 is therefor radially outward of the outer surface of the shank 10 and the concave surface 20 of such strip or cutter element 17 merges into the convex outer surface of the shank 10.

Figure 3:
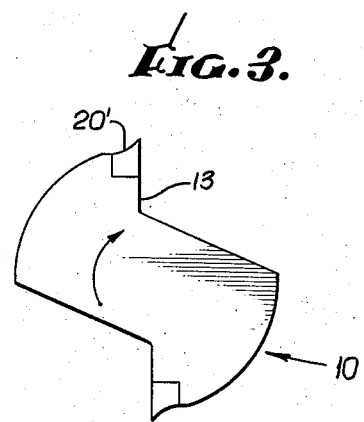
FIG. 3 is an enlarged end view of a slightly modified form of router made in accordance with the present invention.
Figure 2:
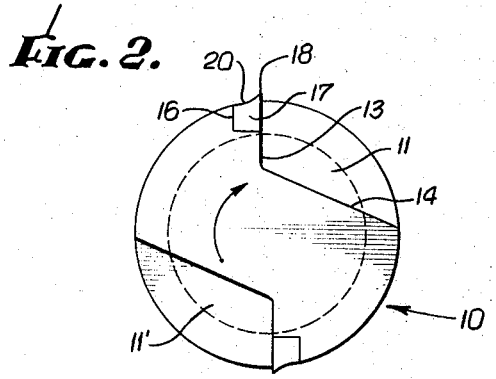
FIG. 2 is an end view of the router shown in FIG. 1.

In FIGS. 1 and 2, the concave surface 20 is formed only in the hardened or tungsten carbide cutter strip 17. As shown in FIG. 3, this concave surface there indicated as 20', may actually extend from the cutting edge 18 and pass through a zone which is below or inward of the radial cylindrical surface of the shank 10 before merging with the surface of the shank. In other words, as shown in FIG. 3, the concave surface is formed both in the cutter strip 17 and a portion of the convex outer surface of the shank. These concaved surfaces 20 and 20' merging with the face of the cutter strip and thereby forming a cutting edge 18 on such cutter strip have been found to preclude the undesirable "build-up" of material being cut on the outer surface of the router. It is by this construction that the present invention provides a router having a greatly increased effective life.

I claim:

1. An improved, self-cleaning router provided with a shank having flutes, the face of each flute including a marginal recess, a hard cutter strip fastened in said recess to present a face virtually coplanar with the face of the flute, said cutter strip having an outer concave surface merging with the face of the strip to form a cutting edge.

2. A router as stated in claim 1 wherein the shank is generally cylindrical, the cutter strip is of tungsten carbide, the cutting edge of the strip lies radially outward of the shank and a portion of the concaved outer surface extends to the shank surface.

References Cited

UNITED STATES PATENTS

| | | | |
|---|---|---|---|
| 1,789,793 | 1/1931 | Wedhorn | 29—103 |
| 1,887,372 | 11/1933 | Emmons | 29—103 X |

FOREIGN PATENTS 211,705    11/1957    Australia.

HARRISON L. HINSON, *Primary Examiner.*